United States Patent
Li et al.

(10) Patent No.: US 11,641,089 B2
(45) Date of Patent: May 2, 2023

(54) CLADLESS FIBER FOR FIBER LASER PUMP AND COMBINER

(71) Applicant: NLIGHT, INC., Camas, WA (US)

(72) Inventors: Shuang Li, Camas, WA (US); Jiamin Zhang, Vancouver, WA (US); Manoj Kanskar, Portland, OR (US); Chendong Bai, Camas, WA (US)

(73) Assignee: NLIGHT, INC., Camas, WA (US)

( * ) Notice: Subject to any disclaimer, the term of this patent is extended or adjusted under 35 U.S.C. 154(b) by 0 days.

(21) Appl. No.: 17/761,803

(22) PCT Filed: Sep. 16, 2020

(86) PCT No.: PCT/US2020/051116
§ 371 (c)(1),
(2) Date: Mar. 18, 2022

(87) PCT Pub. No.: WO2021/067037
PCT Pub. Date: Apr. 8, 2021

(65) Prior Publication Data
US 2022/0344890 A1    Oct. 27, 2022

Related U.S. Application Data

(60) Provisional application No. 62/908,508, filed on Sep. 30, 2019.

(51) Int. Cl.
*H01S 3/094* (2006.01)
*H01S 3/0941* (2006.01)

(52) U.S. Cl.
CPC ...... *H01S 3/094053* (2013.01); *H01S 3/0941* (2013.01); *H01S 3/094003* (2013.01)

(58) Field of Classification Search
CPC ......... H01S 3/094053; H01S 3/094003; H01S 3/0941; H01S 3/094019
See application file for complete search history.

(56) References Cited

U.S. PATENT DOCUMENTS

| 7,400,795 B2 * | 7/2008 | Raszka ............. G02B 6/02033 385/127 |
| 10,267,993 B2 | 4/2019 | Kliner |

(Continued)

FOREIGN PATENT DOCUMENTS

| JP | 2018124428 A | 8/2018 |
| WO | 1989/011743 A1 | 11/1989 |
| WO | 2012/088267 A2 | 6/2012 |

OTHER PUBLICATIONS

European Patent Office; International Search Report and Written Opinion PCT/US2020/051116 dated Dec. 3, 2020; 7 Pages.

(Continued)

*Primary Examiner* — Xinning(Tom) Niu
*Assistant Examiner* — Delma R Fordé
(74) *Attorney, Agent, or Firm* — Schwabe Williamson & Wyatt

(57) ABSTRACT

Some embodiments may include a packaged laser diode assembly, comprising: a length of optical fiber having a core and a polymer buffer in direct contact with the core, the length of optical fiber having a first section and a second section, the first section of the length of optical fiber including a tip of an input end of the optical fiber, wherein the polymer buffer covers only the second section of the first and second sections; one or more laser diodes to generate laser light; means for directing a beam derived from the laser light into the input end of the length of optical fiber; a light stripper attached to the core in the first section of the length of optical fiber. Other embodiments may be disclosed and/or claimed.

18 Claims, 2 Drawing Sheets

(56) References Cited

U.S. PATENT DOCUMENTS

| | | | | |
|---|---|---|---|---|
| 2014/0205236 A1* | 7/2014 | Noguchi | ............... | G02B 6/32 |
| | | | | 385/33 |
| 2014/0211818 A1* | 7/2014 | Hou | ............... | G02B 6/14 |
| | | | | 372/6 |
| 2017/0371097 A1 | 12/2017 | Wu et al. | | |
| 2018/0278008 A1* | 9/2018 | Hemenway | ............... | H01S 5/4031 |

OTHER PUBLICATIONS

Federal Institute of Industrial Property; International Search Report and Written Opinion PCT/US2020/051116 dated Dec. 3, 2020; 7 Pages.

Federal Institute of Industrial Property; International Preliminary Report on Patentability PCT/US2020/051116 dated Apr. 14, 2022; 6 Pages.

* cited by examiner

CLADLESS FIBER FOR FIBER LASER PUMP AND COMBINER

RELATED APPLICATIONS

The present application is a National Phase entry under 35 U.S.C. § 371 of International Application No. PCT/US2020/051116, filed on Sep. 16, 2020, which claims priority to U.S. Provisional Application No. 62/908,508, filed on Sep. 30, 2019, the entire contents of these applications are incorporated herein by reference in their entirety.

TECHNICAL FIELD

The present disclosure relates to laser diodes.

BACKGROUND

Fiber lasers are widely used in industrial processes (e.g., cutting, welding, cladding, heat treatment, etc.) In some fiber lasers, the optical gain medium includes one or more active optical fibers with cores doped with rare-earth element(s). The rare-earth element(s) may be optically excited ("pumped") with light from one or more semiconductor laser sources.

High brightness diode pump lasers have led to advances in high power fiber laser development. In order to achieve a high brightness feature with diode laser package designs, the design room for coupling spot and launch numerical aperture (NA) may be very tight with pigtail fiber. Some designs may couple light into the fiber cladding. Effective stripping of the coupled cladding light may be required for operational reliability and/or reduced thermal load of high power diode laser packages.

BRIEF DRAWINGS DESCRIPTION

The accompanying drawings, wherein like reference numerals represent like elements, are incorporated in and constitute a part of this specification and, together with the description, explain the advantages and principles of the presently disclosed technology.

DETAILED DESCRIPTION

Figure 2:
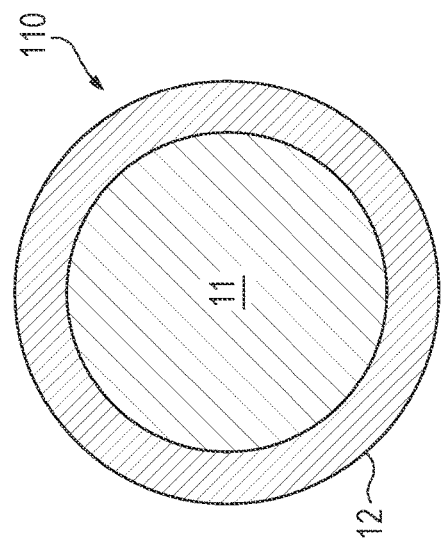
FIG. 2 illustrates a cross-sectional view of an optical fiber with a pure fused silica core and low index polymer buffer in direct contact with the core, according to various embodiments.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items. The systems, apparatus, and methods described herein should not be construed as limiting in any way. Instead, the present disclosure is directed toward all novel and non-obvious features and aspects of the various disclosed embodiments, alone and in various combinations and sub-combinations with one another. The term "or" refers to "and/or," not "exclusive of" (unless specifically indicated).

The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation. Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus.

Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art. In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections.

Examples are described with reference to directions indicated as "above," "below," "upper," "lower," and the like. These terms are used for convenient description, but do not imply any particular spatial orientation.

Some cladding light, especially with a low NA launch condition, is hard to strip off even by using a cladding light stripper. It is this type of cladding light that may cause fiber burn (e.g., in a single clad fiber) or increased thermal load on a package of pump combiners.

There are a number of ways for stripping out high NA cladding light, but the low NA cladding light may be hard to strip off. The difficulty of low NA cladding light stripping comes from the feature of nearly straight light propagation (e.g., parallel to an axis of the core of the optical fiber), that is, nearly no light propagates through an outer surface of the cladding. The low NA cladding light could propagate through a cladding light stripper without losing any power. When this cladding light reaches a fiber coating section in a single clad fiber case, the cladding light may enter a fiber polymer coating layer and could cause fiber burn. If a double cladding fiber is used for a diode package, this cladding light may lead to either fiber burn on a pump combiner input fiber or increased thermal load on a pump combiner package.

Some designs may include a fiber bend and/or apply localized stress to the fiber of cladding light strippers to reduce the fiber burn or the increased thermal load. However, these approaches may not be suitable for some laser diode packages due to space constraints.

For a fiber laser combiner, maintaining the brightness of the combined beam depends on how closely optical fibers can be stacked in the fiber input bundle. In an optical fiber with a fiber glass cladding around the fiber core, fiber stacking diameter is greatly increased, which may reduce output brightness of the combiner. One possible approach is to thin and/or remove the fiber glass cladding at the fiber laser combiner.

Some embodiments described herein may eliminate the problem of low NA light entering a fiber cladding layer and/or avoid the need to thin and/or remove fiber glass cladding at a fiber laser combiner by using cladless fiber in a laser pump package and/or as combiner input fibers. In addition to eliminating the problem of low NA light entering a fiber cladding layer and optimizing the fiber laser combiner interface, use of the cladless optical fiber may reduce costs associated with the laser pumps and combiner due to simpler preform.

One embodiment of a fiber laser including laser pumps and combiner may utilize a polymer coated cladless optical fiber in which a polymer buffer is in direct contact with the fiber core. In contrast to other fiber laser pumps and combiner in which the optical fiber may have a glass core, a glass clad (0.015 or 0.22 NA), and a polymer buffer (low or high index), some fiber laser pumps and combiners described herein may have a pure fused silica core and low index polymer buffer (e.g., 0.5 NA), and no inner class clad.

On the cladless optical fiber, the polymer coating may be removed to expose the fiber core in a section at the input end of the cladless optical fiber, and/or in another section where the cladless optical fiber enters the combiner. For the laser pumps, a light stripper may be installed close to the tip of each cladless optical fiber in direct contact with the exposed fiber core. The light stripper may be similar to any known clad light stripper (CLS), but may be attached to the exposed core rather than a cladding. In one embodiment, the light stripper may be a Fluorine-doped (F-doped) glass tube with outer surfaces intentionally roughened up and/or having other light scattering features. The F-doping level may be selected to create a desired NA cutoff value (e.g., less than 0.22) with respect to the glass core. In other examples the glass tube may be doped with some other halogen and/or some other dopant to provide some other selected NA cuttoff value. Attachment may be similar to known schemes for attaching a CLS to an optical fiber, for instance by inserting the optical fiber into a glass tube and then heating the glass tube to collapse the glass tube onto the optical fiber (the glass tube softens and shrink-fits onto the optical fiber to form an all-around contact).

Thus, light in the core with a propagation angle larger than the NA cutoff value may escape into the glass tube. Low NA light overfilling the core may enter the light stripper via a light stripper front surface (which may be roughened, sloped, and/or treated with a reflective coating, e.g., a high-reflection (HR) coating) and translate into high NA light via scattering and/or diffraction. High NA light in the light stripper may be extracted out once the light hits a roughened exterior surface of the light stripper. Therefore, both low and high NA light may be efficiently stripped by the light stripper. After the light stripper, the light in the fiber core may maintain the launch NA throughout the optical fiber, even though the buffer may provide a given NA (e.g., 0.46 NA).

Where the polymer coating is removed at the input to the combiner, the exposed fiber cores (e.g., of each optical fiber) may be bundled as close as possible to each other (e.g., with no spacing between the exposed optical fiber cores). This may provide tighter spacing of the fiber bundle than systems in which a cladding is thinned at the fiber bundle. The tighter spacing may reduce the amount of tapering required to mode match the combiner output fiber for conserving the pump brightness (or freeing up space for more input to provide a higher power laser package).

Figure 1:
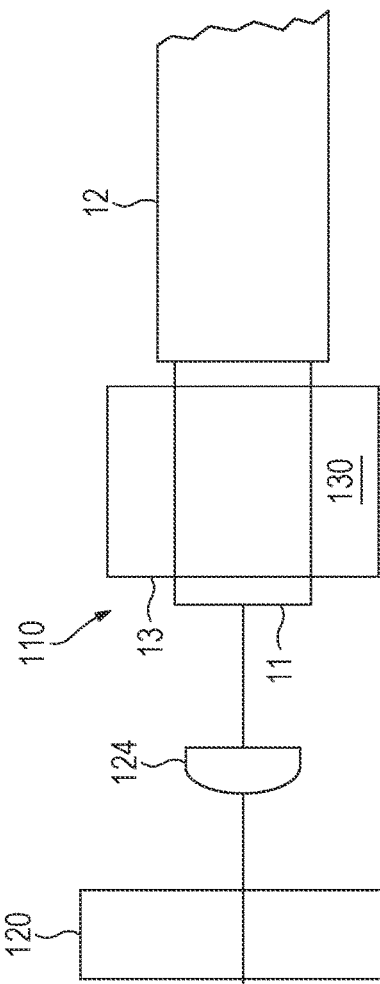
FIG. 1 illustrates a packaged laser diode assembly with a light stripper attached to a fiber core, according to various embodiments.
Figure 1:
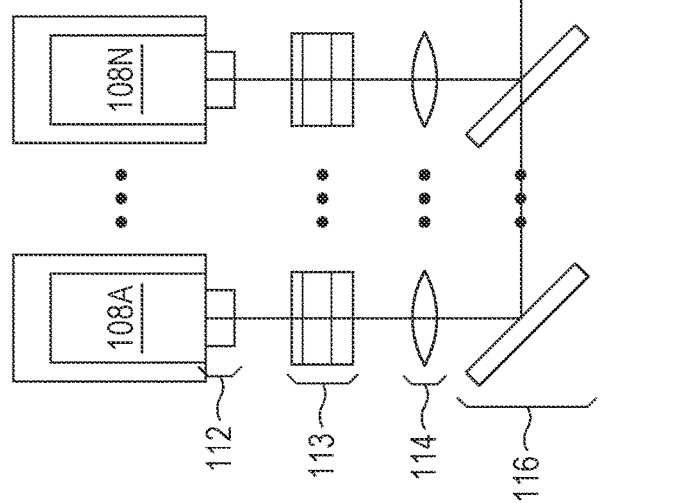

FIG. 1 illustrates a packaged laser diode assembly 100 with a light stripper 130 attached to a fiber core 11, according to various embodiments. The packaged laser diode assembly 100 may include an optical fiber 110 having a polymer buffer 12 surrounding and in physical contact with the core 11. FIG. 2 illustrates a cross section of the optical fiber 110 showing the polymer buffer 12 in direct contact with the fiber core 11 (e.g., no intervening inner glass clad).

Referring again to FIG. 1, the polymer buffer 12 has been removed from a first section of the optical fiber 110 leaving material of the polymer buffer 12 on a second section as shown. Removal of the polymer material may be by any known method such as by exposing the end of the optical fiber to a temperature between a melting point of the polymer material and a melting point of the core material. The light stripper 130 may be installed on the exposed core 11 in the first section (e.g., collapsed on the fiber core 11 to form an all-around contact).

The system 100 may also include one or more diode lasers 108A-N to generate one or more laser beams, respectively, and a set of optics between the one or more diode lasers 108A-N and a tip of the optical fiber 110. The one or more diode lasers 108A-N may be similar to any known laser diodes, such as high power laser diodes. The set of optics between the one or more diode lasers 108A-N and the tip of the optical fiber 110 may be in known optical components used in packaged laser diode assembly. The set of optics may process the laser beams generated by the diode lasers 108A-N and direct the processed light into the tip of the optical fiber 110.

Reference is now made to an example in which the diode lasers 108A-N and the optics to process laser beams thereof are similar to any diode lasers in U.S. Patent Application 2017/0235057, which is incorporated by reference herein. The diode lasers 108A-N may be secured so as to be situated at different heights, typically so as to monotonically descend or ascend (a single one of the diode lasers 108A-N may be secured to each step and the diode lasers are secured to the steps so as to emit laser radiation along substantially parallel axes).

The emitted beams from the diode lasers 108A-N may be received and collimated by fast axis collimation optics 112 and slow axis collimation optics 114 to produce collimated beams. In some embodiments, volume Bragg grating elements 113 may be positioned between the fast axis collimation optics 112 and the slow axis collimation optics 114 to provide locking of the wavelength of the lasers diodes 108A-108N. Turning mirrors 116 may receive the collimated beams (which may propagate generally parallel to each other after collimation). In this example, the turning mirrors 116 are situated to reflect the collimated beams at right angles so that the reflected beams are directed to a combiner 120 (such as any beam compressor described in the '057 publication).

An output of the combiner 120 (e.g., compressed beams) may be directed to a refocusing lens 124 that directs the output into the tip of the optical fiber 110. The refocusing lens 124 may be similar to any lens described in the '057 publication.

According to various embodiments, the core 11 may be a pure fused silica core. The polymer buffer 12 may be a low index polymer buffer (e.g., 0.5 NA). The polymer buffer 12 may be in direct contact with the core 11 (no inner glass clad).

The light stripper 130 may be made of a doped glass tube (e.g., fluorine doped (also referred to as F-doped here)). The doping level may be selected to create a particular NA cutoff value (e.g., less than or equal to a threshold, such as 0.22 NA) with respect to the core 11 glass. Any portion of an outer surface of the light stripper 130 (e.g., the front surface 13) may be intentionally roughened up.

Figure 3:
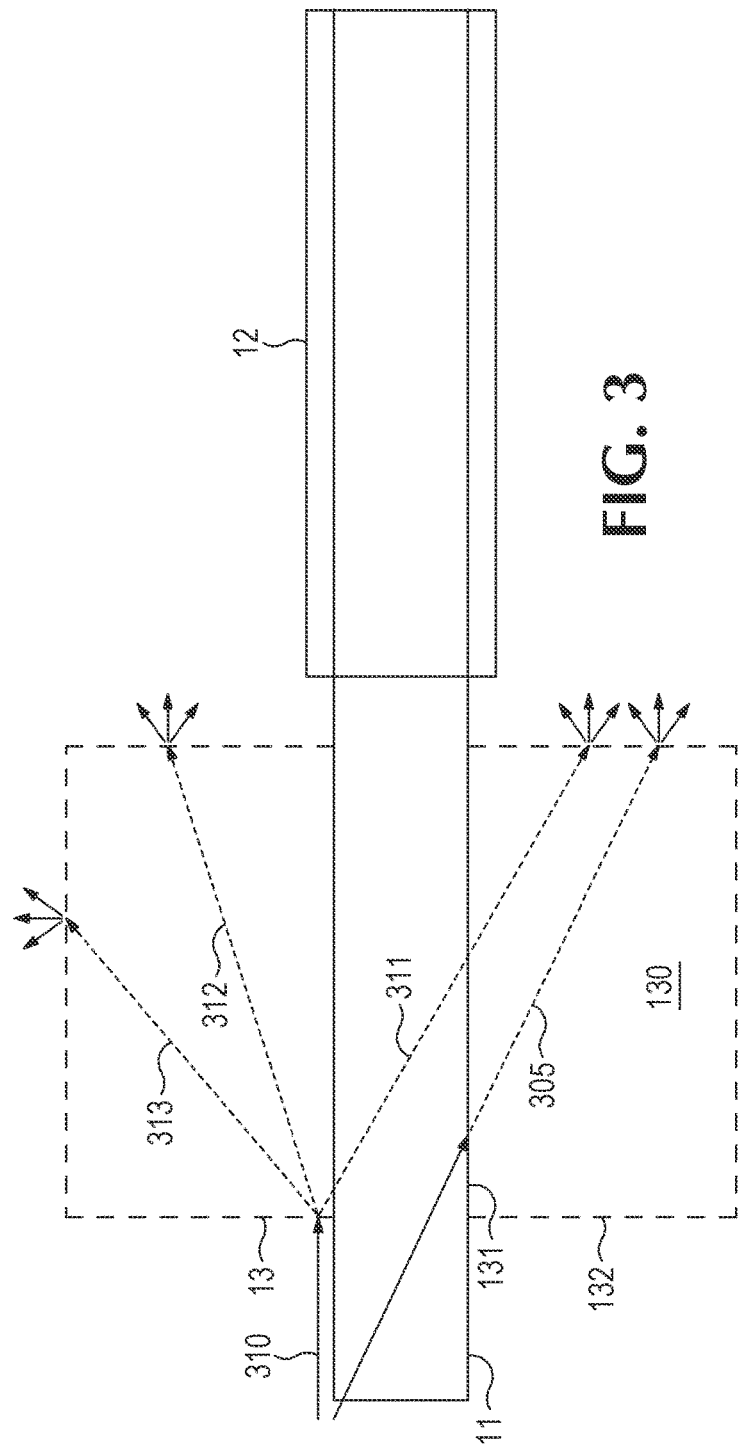
FIG. 3 illustrates light stripper attached to a fiber core in which low numerical aperture (NA) light is scattered and/or diffracted, according to various embodiments.

Referring now to FIG. 3, light stripper 130 may include an interior surface 131 and an exterior surface 132. The interior surface 131 may be coupled to the fiber core 11. In contrast to known CLSs, which may have only an interior surface arranged to receive light (e.g., the interior surface that may be coupled to the clad), both the interior surface 131 and 132 may be arranged to receive light 305 and 310, respectively. One or more light scattering features may be arranged on the exterior surface 132. For instance, a front exterior surface (to receive light 310) may include various light scattering features such as a roughened surface, sloped surface, a surface having a reflective coating thereon (the light scattering features are represented in a similied form by the dashed line defining the exterior surface 132).

Light 305 in the fiber core 11 with a propagation angle larger than the NA cutoff value may be received at the interior surface 131 and escape into the light stripper 130. Low NA light 310 overfilling the fiber core 11 may enter the light stripper 130 via a front 13 of the exterior surface 132 of the the light stripper 130 (low NA light 310 may be part of the light output from refocusing lens 124 (FIG. 1) as, in order to have high brightness, the size of the fiber core 11 may be closely matched with the refocusing spot size of a laser beam output by the refocusing lens 124). In the illustration, the front 13 is simplified for brevity, but it should be understood that the front 13 may include various light scattering features such as a roughened surface, sloped surface, a surface having a reflective coating thereon, or the like, or combinations thereof. The front 13 of the exterior surface may translate the light 310 into high NA light via scattering and/or diffraction. High NA light 311-313 in the light stripper 130 may be extracted out once the light hits another surface, such as the sidewall or rear of the exterior surface 132 of the light stripper 130. The rear and/or sidewall (the light stripper 310 may be cylindrically shaped) may include the same or different light scattering features as those provided on the front 13. Therefore, both the high NA light 305 in the fiber core 11 and the low NA light 310 may be efficiently striped by the light stripper 130. After the light stripper 130 (i.e., the second section of the optical fiber), light in the core 11 may maintain the launch NA throughout the optical fiber (it is noted that the polymer buffer 12 may provide a threshold NA, such as 0.46 NA).

Figure 4:
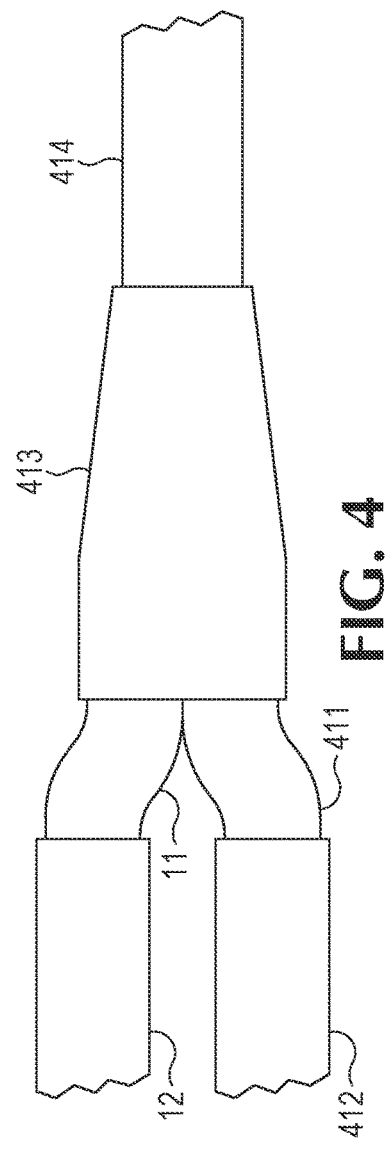
FIG. 4 illustrates a cladless fiber bundle coupled to a combiner input with minimal tapering, according to various embodiments.

Referring now to FIG. 4, in a third section of the optical fiber the polymer material 12 and 412 may be removed (e.g., in a similar fashion as removal in the first section as shown in FIG. 1). This may allow the optical fiber to be packaged tightly with one or more optical fibers of one or more additional pumps, respectively. In the illustrated example, for brevity, only two optical fibers are shown, but in other examples there may be any arbitrary number of optical fibers bundled together depending on desired system characteristics (e.g., six optical fibers, eighteen optical fibers, etc.) It should be understood that each optical fiber may include a corresponding packaged laser diode assembly similar to packaged diode laser assembly 100 (FIG. 1).

Referring again to FIG. 4, the fiber cores 11 and 411 of the optical fibers may be in physical contact (e.g., no spacing between cores 11 and 411 in the fiber bundle). The fiber bundle may be input into a combiner 413. The tighter spacing may reduce the amount of tapering required to mode match the combiner output fiber 414 for conserving the pump brightness (or freeing up space for more input to provide a higher power laser package).

The various embodiments described herein may eliminate the need to strip low NA cladding light. The various embodiments may use an all glass light stripper (or some other compact, effective light stripping device) installed on an exposed fiber core. The various embodiments may achieve tighter bundling at the fiber combiner interfaces than other systems in which a clad is thinned, thus better conserving the pump brightness. The various embodiments may be employed to provide a high-power, fiber coupled laser package.

In view of the many possible embodiments to which the principles of the disclosed technology may be applied, it should be recognized that the illustrated embodiments are only preferred examples and should not be taken as limiting the scope of the disclosure. We claim as our invention all that comes within the scope and spirit of the appended claims.

The invention claimed is:

1. A packaged laser diode assembly, comprising:
   a length of optical fiber having a core and a polymer buffer in direct contact with the core, the length of optical fiber having a first section and a second section, the first section of the length of optical fiber including a tip of an input end of the optical fiber, wherein the polymer buffer covers only the second section of the first and second sections;
   one or more laser diodes to generate laser light;
   means for directing a beam derived from the laser light into the input end of the length of optical fiber;
   a light stripper coupled with the core in the first section of the length of optical fiber;
   wherein a front exterior surface of the light stripper closest to the tip of the optical fiber comprises a means for scattering light and/or a means for diffracting light, and
   wherein the light stripper is arranged to strip high numerical aperture (NA) light received at an interior of the light stripper from the core and low NA light received at a front exterior surface of the light stripper.

2. The packaged laser diode assembly of claim 1, wherein the length of optical fiber further comprises:
   a third section; and
   a combiner, wherein the core in the third section of the length of optical fiber is coupled to an input of the combiner.

3. The packaged laser diode assembly of claim 2, wherein the polymer buffer covers only the second section of the first, second, and third sections, and wherein the core in the third section of the length of optical fiber is in direct contact with at least one core of one or more additional optical fibers coupled to the input of the combiner.

4. The packaged laser diode assembly of claim 1, wherein the light stripper comprises a glass tube collapsed on the core in the first section to form an all-around contact, wherein the front exterior surface is roughened, sloped, and/or covered with a reflective coating.

5. The packaged laser diode assembly of claim 4, wherein the glass tube is doped to create an NA cutoff value of less than 0.22.

6. The packaged laser diode assembly of claim 5, wherein the dopant comprises Fluorine.

7. The packaged laser diode assembly of claim 1, wherein the front exterior surface is roughened, sloped, and/or coated with a reflective agent to scatter and/or diffract low NA light from the beam directing means.

8. The packaged laser diode assembly of claim 1, wherein the core comprises pure fused silica core, and wherein the light stripper comprises doped glass.

9. The packaged laser diode assembly of claim 5, wherein the polymer buffer comprises a low index polymer buffer.

10. The packaged laser diode assembly of claim 1, wherein low NA light is light with an NA value at or below 0.22.

11. The packaged laser diode assembly of claim 1, wherein high NA light is light with an NA value at or above 0.22.

12. A packaged laser diode assembly, comprising:
a length of optical fiber having a core and a polymer buffer in direct contact with the core, the length of optical fiber having a first section and a second section, the first section of the length of optical fiber including a tip of an input end of the optical fiber, wherein the polymer buffer covers only the second section of the first and second sections;
one or more laser diodes to generate laser light;
means for directing a beam derived from the laser light into the input end of the length of optical fiber; and
means for stripping light from the core in the first section of the length of optical fiber;
wherein the light stripping means is in direct contact with the core in the first section of the length of optical fiber; and
wherein the light stripping means is arranged to strip high numerical aperture (NA) light received at an interior of the light stripping means from the core and low NA light received at a front exterior surface of the light stripping means.

13. The packaged laser diode assembly of claim 12, wherein the length of optical fiber further comprises:
a third section; and
a combiner, wherein the core in the third section of the length of optical fiber is coupled to an input of the combiner.

14. The packaged laser diode assembly of claim 13, wherein the polymer buffer covers only the second section of the first, second, and third sections, and wherein the core in the third section of the length of optical fiber is in direct contact with at least one core of one or more additional optical fibers coupled to the input of the combiner.

15. The packaged laser diode assembly of claim 12, wherein the core comprises pure fused silica core, and wherein the light stripping means comprises doped glass.

16. The packaged laser diode assembly of claim 12, wherein a surface area of the tip of the input end of the optical fiber corresponds with a surface area of a refocusing spot size of the beam, and wherein the light stripping means prevents some light of the beam from entering the second section of the length of optical fiber.

17. The packaged laser diode assembly of claim 12, wherein low NA light is light with an NA value at or below 0.22.

18. The packaged laser diode assembly of claim 12, wherein high NA light is light with an NA value at or above 0.22.

* * * * *